Jan. 30, 1968     E. J. HEARTSTEDT     3,366,266

FLEXIBLE FLOAT SEAL

Filed Feb. 18, 1966     2 Sheets-Sheet 1

INVENTOR.
EDMUND J. HEARTSTEDT

Jan. 30, 1968  E. J. HEARTSTEDT  3,366,266
FLEXIBLE FLOAT SEAL
Filed Feb. 18, 1966  2 Sheets-Sheet 2
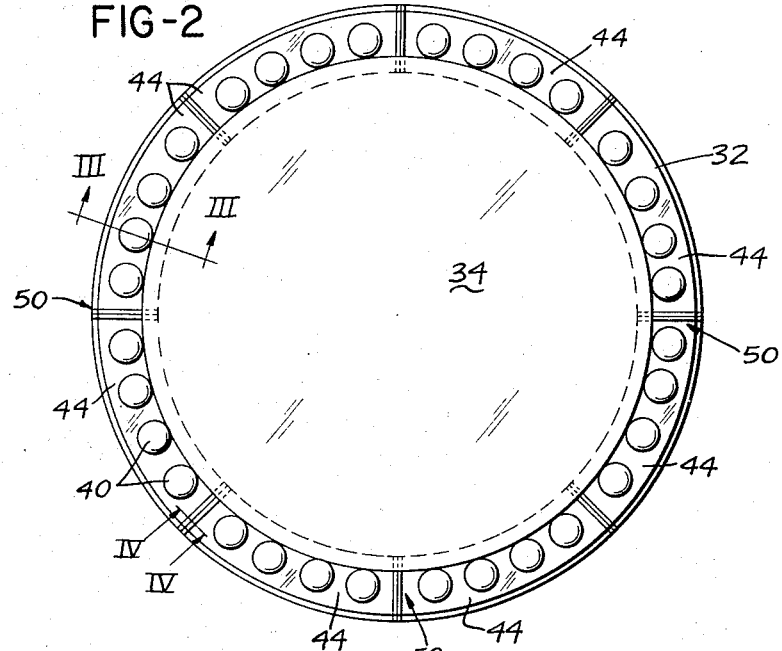
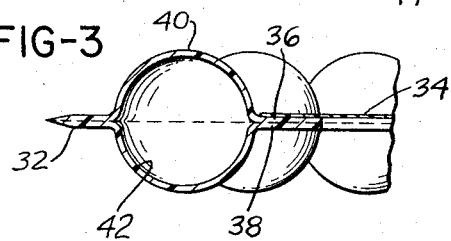
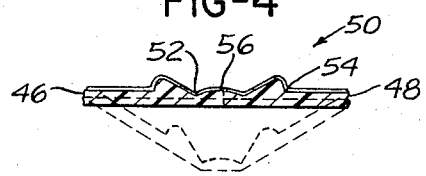
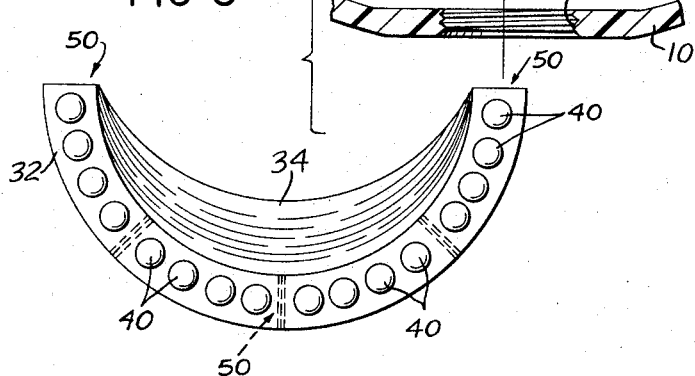
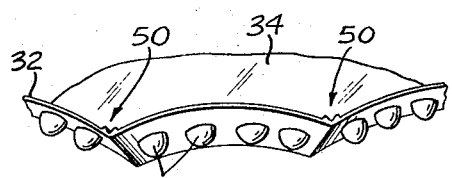
INVENTOR.
EDMUND J. HEARTSTEDT
BY

United States Patent Office 3,366,266
Patented Jan. 30, 1968

3,366,266
FLEXIBLE FLOAT SEAL
Edmund J. Heartstedt, Ashland, Ohio, assignor to The
F. E. Myers & Bro. Co., Ashland, Ohio, a corporation
of Ohio
Filed Feb. 18, 1966, Ser. No. 528,573
7 Claims. (Cl. 220—26)

This invention relates to a float seal for a hydropneumatic tank such as the storage tank of a domestic water supply system.

In particular, the present invention is related to a float seal of the nature referred to and a method of making the float seal so that the seal can be introduced into a tank through a small opening thereof and will operate as a substantially rigid float seal after being introduced into the tank.

Float seals for hydropneumatic tanks are known and are widely used. Their purpose is to isolate the air in the tank from the water so the air does not diffuse into the water and cause the tanks gradually to lose its change of air. Such float seals float on the water and can take the form of discs of relatively rigid plastic material such as polystyrene foam, or semi-flexible discs and, in some cases, are extremely thin and flexible. The substantially rigid floats may be employed in tanks where the tank is completed by closing it at one end with an end member. No difficulty is experienced with such tanks in inserting a substantially rigid float member before the tank is closed by the end member because the inside of the tank is completely exposed. With tanks constructed of glass reinforced plastic material or plastic coated steel, however, the tank is made in one piece and is provided with an opening or openings, usually a single bottom opening, to which pipes or other fittings are connected and in such case there is no possibility of introducing a rigid float into the tank during manufacture thereof.

With tanks made of glass fiber reinforced plastic material, therefore, thin flexible floats have been employed which can be rolled up and inserted through one of the small openings left in the tank after it has been manufactured. Also, a float has been proposed which is made of thin strips of rigid material interconnected by a tie cord and in which the strips are threaded on the tie cord and then introduced through the opening in the tank before the tie cord is tightened and, thereafter, upon tightening and tying the tie cord the strips are pulled together to form the float.

In the case of the last-mentioned type of float, it will be evident that considerably less than complete coverage of the area of the tank will be obtained. The float must of necessity fit loosely within the tank and also there will be cracks between adjacent ones of the strips through which air can pass from the top of the tank to the water in the bottom of the tank.

In connection with the first mentioned float, namely, a float which is extremely flexible, poor flotation characteristics are encountered and the float not only tends to dive in the water when the water is agitated, thereby exposing the water of the tank to the air but it has also occurred, that upon exhausting of the water from the tank, the air pressure above the float will force it out through the water outlet opening with resulting obvious difficulties.

With the foregoing in mind, a primary objective of the present invention is the provision of a float seal for a hydropneumatic tank which overcomes the difficulties referred to above and which, therefore, provided for improved operating characteristics.

Still another object of the present invention is the provision of a float seal for a hydropneumatic tank which is relatively inexpensive to manufacture.

Another object of the present invention is the provision of a float seal and a method of manufacturing the float seal in which the float seal can be folded and introduced into a tank and will operate substantially as a rigid float after it is unfolded in the tank.

Another object of the present invention is the provision of a float seal and the method of manufacturing the same in which the manufacturing procedures in connection with the float are such that the float is substantially completely impervious to the passage of gas or liquid and will act as a rigid float within the tank, but will be extremely flexible so as to be insertable through a small opening in the tank while at the same time extremely large and complex forming equipment is not required for manufacturing the float.

The foregoing objects of the present invention as well as still other objects and advantages thereof will become more apparent upon reference to the following detailed specification taken in connection with the accompanying drawings in which:

FIGURE 2 is a plan view looking down on top of the float seal;

FIGURE 3 is a fragmentary sectional view indicated by line III—III on FIGURE 2 showing in section the construction of the buoyant rim part of the float seal;

FIGURE 4 is a fragmentary sectional view drawn at enlarged scale and indicated by line IV—IV on FIGURE 2 and showing the construction of a hinge joint forming a part of the float seal of the present invention;

FIGURE 5 is a somewhat schematic view showing a float seal folded and about to be introduced into a small opening in a tank;

FIGURE 6 is a schematic view showing how the float seal of the present invention acts when it is forced into the lower portion of the tank by the exhausting of water from the tank and which action prevents the float seal from being drawn or blown into the water discharge opening of the tank by the air under pressure in the tank;

Figure 1:
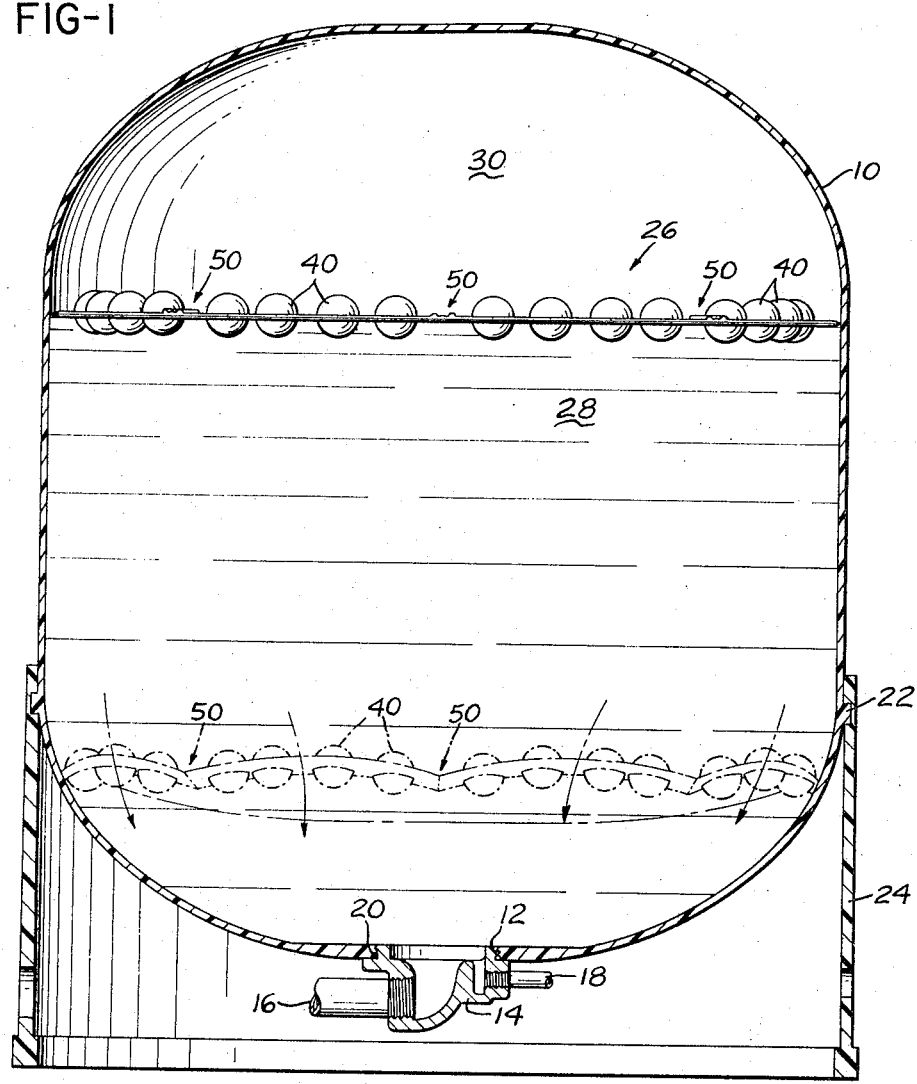
FIGURE 1 is a vertical sectional view through a modern hydropneumatic tank showing a float seal therein according to the present invention.

Referring to the drawings somewhat more in detail, in FIGURE 1, 10 indicates a tank such as might be employed in connection with a domestic water supply system. Tank 10, it will be observed, is a single piece of material such as glass fiber reinforced plastic material. The tank as illustrated has a single opening 12 in the bottom thereof in which a fitting 14 is mounted. The fitting 14 is connected to water conduit 16 and a charging conduit 18 through which air can be supplied to the interior of the tank. Fitting 14 may be threaded into the bottom of the tank and sealed thereto as by a sealing ring 20, or the fitting may be connected to the tank by epoxy resin or some other suitable hard, strong, permanent cement.

The tank may include an external annular rib 22 formed thereon which is received in a corresponding groove in a cylindrical supporting base member 24.

Disposed within the tank is a float seal generally indicated at 26 which is constructed in accordance with the present invention. The float seal extends substantially from wall to wall of the tank in every lateral direction and separates the liquid 28 in the tank from the air 30 in the tank. The provision of the float seal, as is known, eliminates, or at least, greatly reduces the diffusion of the air into the liquid so that the tank will stay charged with the proper amount of air for a much longer time than would be the case if the float seal were not present. The float seal is, of course, buoyant in the liquid 28, usually water, and moves up and down in the tank as the liquid level therein changes.

It will be noted that tank 10 has a rounded upper portion and a rounded lower portion. It is advisable to construct a fiber glass reinforced plastic tank in this manner so as to avoid sharp corners where high stresses could be set up in the material in use. The rounded upper and lower portions of the tank, however, have a certain effect upon the float seal. For example, if the liquid level in tank 10 rises to the point that the float seal is pushed into the rounded upper part of the tank, a rigid seal can quite readily become broken by the water pressure acting on the bottom face therein.

Similarly, if the water is exhausted from the tank until the float seal is pushed by the air into the rounded lower part of the tank a rigid float, similarly, could be broken by the air pressure acting on the upper face therein.

A flexible seal will avoid the difficulty of the seal breaking when it is pushed into the rounded portion of the tank but with a completely flexible seal, when it is pushed into the lower portion of the tank, it may remain sealed against the side edges of the tank and thus forced out the water discharge opening and into the discharge conduit by the air pressure above it. This, of course, can lead to extreme difficulty which might require dismantling of the conduits leading from the tank in order to remove the float seal therefrom and restore the system to operative condition.

The float seal of the present invention avoids the difficulties referred to above because, while it acts as a substantially rigid float in that it cannot be forced by the air pressure out the discharge opening of the tank, it is still possessed of such flexibility that it will not become broken if forced either into the upper or lower rounded portions of the tank.

The exact nature of the float seal of the present invention will become more apparent upon reference to FIGURES 2 through 6. In these figures it will be noted that the float seal comprises of outer annular rim part 32 forming a ring at the periphery of the seal while the center portion of the float seal consists of a thin flexible membrane 34 which, at its periphery, is sealed to the inner edge of rim part 32.

As will be seen in FIGURE 3, the rim part 32 consists of an upper strip 36 and a lower strip 38 which may comprise for example, plastic material and which strips are heat sealed or otherwise sealingly connected at their adjoining faces. The two strips are formed with concavities 40 and 42 which preferably register when the strips are assembled and thus form buoyancy chambers of substantial size. When the buoyancy chambers are formed as shown in FIGURE 3, so as to be spherical, they are extremely strong against the pressure which acts thereon within the tank and they are not easily collapsed.

Furthermore, the rim part 32 is made up of relatively small sector shaped portions 44 of which, as will be seen in FIGURES 2 and 5, there are eight. There could, of course, be more or fewer of the sectors but it has been found that forming the rim part in eight sectors is convenient because individual sectors are relatively small and can easily be manufactured and the desired flexibility is imparted to the float seal while it still acts as a substantially rigid member during normal operations within the tank.

The material of the sectors 44 is a plastic material characterized in being heat softenable. Many plastic materials would be suitable for this purpose although it is preferred to employ a polypropolene which is easily worked and which is not attacked by the water or air and which therefore, has extremely long life. The membrane 34 can also be polypropolene and it can, therefore, be heat sealed to the sectors and the entire float then forms one single integrated member of polypropolene.

A particular feature of the present invention is to be found in the manner in which the sectors 44 are interconnected at their adjacent ends. Inasmuch as the material of the sectors is heat softenable and, therefore, flowable, the ends of the sectors 44 are welded together under the action of heat and pressure. The joints formed between adjacent sectors 44 appear as shown in FIGURE 4 which is a section through such a joint. In this view it will be noted that the sector 46 at the left and the sector 48 at the right are interconnected by a weld region 50 formed by softening the adjacent ends of the sectors and causing them to flow together. Within this weld region are two zones 52 and 54 which extend radially of the rim part and which are relatively thin, and therefore, flexible. These thin portions 52 and 54 form hinge means between the sectors so that the sectors can readily be folded upon one another. A joint of this nature is known to have extremely long life and, even though repeatedly flexed, will not fail in use.

The actual thickness of the thin portions 52 and 54 might be for example, on the order of from 15 to 25 thousandths of an inch. Interposed between the thin portions may be somewhat thicker region 56 which may be on the order of about 35 to 45 thousandths of an inch in thickness. The thin regions 52 and 54 are, of course, substantially thinner than the sectors so that the said thin regions form well defined radially extending hinge joints distributed circumferentially about the float seal.

The provision of the hinge joints as described above permits the float seal readily to be folded up and introduced through the aforementioned opening 12 in the bottom of tank 10. This is illustrated in FIGURE 5 wherein the float seal is folded over about two diametrically opposite ones of the hinge joints and then, by gathering up the membrane 34, the entire seal can be fed through the opening 12 and, upon being released within the tank, will open up and occupy its FIGURE 1 position and will float on top of the water when water is supplied into the tank.

It has been mentioned that the float seal according to the present invention will not be forced out through the water discharge opening and what occurs when water is substantially exhausted from the tank is illustrated in dot-dash outline in FIGURE 1 and also in FIGURE 6. The individual sectors 44 of the rim part of the float seal are substantially rigid and, therefore, when the float seal moves into the lower rounded portion of the tank, the float seal will tend to bend at the hinge joints and this will tilt the sectors so that the intermediate portions thereof separate from the tank wall and permit air to pass around the float seal and will thus prevent the float seal from being forced out the discharge opening of the tank.

Similarly, if the float seal is pushed into the rounded upper portion of the tank, the rim part of the float seal will bend at the hinge joints and water will be able to pass about the float seal and breaking of the seal is prevented. At other times, when the float seal is floating on the water and the water level is changing within the tank, or even when the water in the tank is somewhat agitated as during a supply of water into the tank the float seal operates as a substantially rigid float and does not tend to bend within the tank or dive about in the water.

Figure 7:
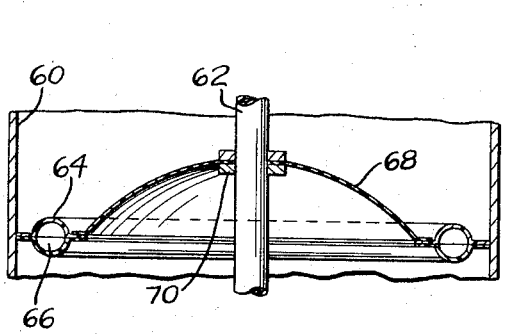
FIGURE 7 is a fragmentary sectional view showing a modified form of the float.
Figure 8:
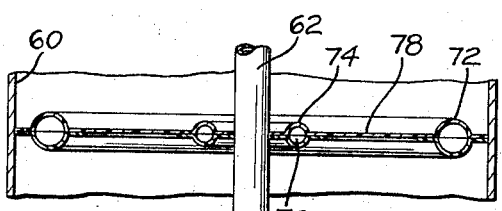
FIGURE 8 is a fragmentary sectional view similar to FIGURE 7, but showing still another modified form of the float.

Substantially the same principle is employed in the float seals illustrated in FIGURES 7 and 8 and which are designed for use in a tank having a central pipe leading downwardly therein from the top of the tank. In these figures, the tank is indicated at 60, and the central pipe therein is indicated at 63.

In FIGURE 7 the float seal comprises a rim part 64 which may be constructed as described in connection with the rim part of the first described float seal, or it may be an entire annular rim formed in one piece and embodying one or more buoyancy chambers 66. A thin flexible membrane 68 extends inwardly from the inner periphery of the rim part and, in the FIGURE 7 modification, is fixedly clamped to center post 62 by member 70. In FIGURE 7 the membrane 68 is advantageously extremely resilient so that it can stretch and permit vertical movement of rim part 64 of the float to follow the water level while member 70 remains in a fixed position on pipe 62.

In FIGURE 8 the float seal illustrated comprises outer rim part 72 which may be constructed the same as rim part 64 in FIGURE 7. In FIGURE 8, however, an inner rim part 74 is provided which slidingly surrounds pipe 62 and which inner rim part advantageously includes buoyancy chamber means 76. Extending between inner rim part 74 and outer rim part 72 is an annular member 78 in the form of a thin flexible membrane. In FIGURE 8 the entire float would move vertically within the tank to follow the water level but in other ways it would operate the same as the previously described modifications.

It will be understood that both of the floats of FIGURES 7 and 8 could have the rim portions thereof constructed of sectors welded together at their ends as has already been described in connection with the principal modification.

It will be understood that this application is susceptible to modification in order to adapt it to different usages and conditions; and accordingly, it is desired to comprehend such modifications within this invention as may fall within the scope of the appended claims.

I claim:

1. A float seal adapted for being folded and inserted through a relatively small opening into a tank and adapted when in the tank to unfold and extend substantially to the walls of the tank in all lateral directions, said seal comprising a buoyant rim part with hollow spherical portions, and a thin flexible fluid impervious disc-like membrane sealed at its periphery to said rim part, said rim part comprising a plurality of sections in end to end relation and hingedly interconnected at their adjacent ends, each sector being relatively rigid between its ends.

2. A float seal according to claim 1 in which said sectors comprise a pair of flat strips sealed together in face to face relation and each having regions formed outwardly from the plane thereof so as to be concave toward the other of said strips to provide said spherical portions for said rim part.

3. A float seal according to claim 1 in which each said sector comprises a pair of flat strips sealed together in face to face relation and registering cavities formed in said strips, each concave toward the strip to form said spherical portions in the said sector.

4. A float seal according to claim 2 in which the hinged interconnection of each sector with the next adjacent sector comprises a region of the rim part extending radially thereacross at the adjacent ends of said sectors which is integrally connected with the sectors on opposite sides thereof and which is thin to permit the sectors interconnected thereby to hinge relative to each other.

5. A float seal according to claim 2 in which the hinged interconnection of each sector with the next adjacent sector comprises a region where the adjacent ends of the sectors are welded together, said region including at least one thin portion which extends radially across the rim part and is uninterrupted so as sealingly but flexibly to interconnect the sectors on opposite sides thereof.

6. In combination; a substantially cylindrical tank with an outwardly convex domed end and an opening in said domed end, and a float seal in the tank buoyant in water introduced into the tank through said opening and substantially separating the water from air in the tank, said seal having a peripheral rim part and a flexible membrane sealed at its periphery to the inner edge of said rim part, said rim part comprising a plurality of substantially rigid sectors hingedly sealingly interconnected at their ends, said rim part having hollow spherical portions, upon movement of the seal into engagement with the domed end of said tank in response to discharge of water therefrom, flexing at the region of interconnection of said sectors and causing portions of said sectors to move away from the tank wall so as to permit air to pass the seal whereby the seal is not forced into said opening by said air.

7. The combination according to claim 6 in which said tank has its other end also domed so as to be convex outwardly and said seal upon being forced into engagement with said other end flexing at said regions to permit water to pass the seal so the seal is not damaged by the pressure of the water thereon.

References Cited

UNITED STATES PATENTS 3,029,971  4/1962  Reynolds _____ 220—26
3,159,301  12/1964  Anderson _____ 220—93

FOREIGN PATENTS 890,422  2/1962  Great Britain.
910,193  11/1962  Great Britain.

RAPHAEL H. SCHWARTZ, *Primary Examiner.*

THERON E. CONDON, *Examiner.*